(12) United States Patent
Lehureau et al.

(10) Patent No.: US 7,040,162 B2
(45) Date of Patent: May 9, 2006

(54) VIBRATING MASS GYRO

(75) Inventors: Jean-Claude Lehureau, Sainte Genevieve des Bois (FR); Bernard Chaumet, Chatellerault (FR); Pierre-Olivier Lefort, Valence (FR)

(73) Assignee: Thales, Neuilly sur Seine (FR)

( * ) Notice: Subject to any disclaimer, the term of this patent is extended or adjusted under 35 U.S.C. 154(b) by 117 days.

(21) Appl. No.: 10/874,753

(22) Filed: Jun. 24, 2004

(65) Prior Publication Data

US 2005/0022596 A1 Feb. 3, 2005

(30) Foreign Application Priority Data

Jun. 27, 2003 (FR) .................................. 03 07827

(51) Int. Cl.
  *G01P 9/04* (2006.01)
(52) U.S. Cl. ................................. 73/504.12; 73/504.13
(58) Field of Classification Search ............. 73/504.02, 73/504.11, 504.12, 504.13
  See application file for complete search history.

(56) References Cited

U.S. PATENT DOCUMENTS

| | | | |
|---|---|---|---|
| 6,003,371 A * | 12/1999 | Okada | ..................... 73/504.02 |
| 6,089,093 A | 7/2000 | Lefort et al. | |
| 6,094,985 A | 8/2000 | Kapels et al. | |
| 6,251,698 B1 | 6/2001 | Lefort et al. | |
| 6,311,556 B1 | 11/2001 | Lefort et al. | |
| 6,934,660 B1 * | 8/2005 | Painter et al. | ........... 73/504.12 |

FOREIGN PATENT DOCUMENTS

| | | |
|---|---|---|
| EP | 0971208 A | 1/2000 |
| EP | 1 014 037 A | 6/2000 |
| JP | 8 054242 A | 6/1996 |
| WO | 01/020257 A | 3/2001 |

OTHER PUBLICATIONS

Ayazi F et al "Design and fabrication of 1-23 hight-performance polysilicon vibrating ring gyroscope" Micro Electro Mechanical Systems, 1998, IEEE, pp. 621-626.

* cited by examiner

*Primary Examiner*—John E. Chapman
(74) *Attorney, Agent, or Firm*—Lowe Hauptman & Berner, LLP

(57) ABSTRACT

Unlike customary vibrating mass gyros which operate by exciting a first fundamental mode of vibration of the vibrating mass and by detecting the effect of the Coriolis force on a second fundamental mode of vibration of the vibrating mass orthogonal to the first mode, this gyro operates by giving its suspended mass a circular motion alternately in the forward and reverse directions and by deducing the gyrometric effect from the difference between the apparent frequencies of the circular motion of the suspended mass in one direction and in the other. This allows a considerable reduction in the drafting of the heading measurement obtained with this type of gyro.

23 Claims, 4 Drawing Sheets

VIBRATING MASS GYRO

RELATED APPLICATIONS

The present application claims priority to French Application No. 03 07827 filed on Jun. 27, 2003 and is hereby incorporated by reference in its entirety into this application.

FIELD OF THE INVENTION

The present invention relates to the measurement of the rate of rotation of a craft by means of sensors placed on board the craft. The sensors allowing such a measurement to be made, so-called gyrometric sensors, can implement various physical principles. Three major classes of them are chiefly distinguished: that of gyro lasers, that of fiber optic gyros and that of vibrating mass gyros.

BACKGROUND OF THE INVENTION

The great majority of currently known vibrating mass gyros work by exciting a mode of vibration of the vibrating mass in one direction and detecting the vibrations induced in an orthogonal direction by the Coriolis force. They take multiple forms that are designed more and more often with a view to production of so-called MEMs (MicroElectroMechanical systems). These are the least expensive rate of rotation sensors but they suffer from a lack of medium- and long-term stability inherent in their principle of operation, preventing their use, without frequent readjustments, in medium- and long-term navigation applications.

SUMMARY OF THE INVENTION

An aim of the present invention is vibrating mass gyros with improved stability lending themselves to micro-electromechanical production.

The subject thereof is a vibrating mass gyro comprising a support, a mass, elastic suspensions fixing the mass to the support, and one or more displacement motors sustaining a vibratory motion of the suspended mass, sensors of position of the moving elements of the suspended mass, and a processing device extracting a measurement of circular oscillation rate from the signals delivered by the position sensors, noteworthy in that:
  the mechanical system consisting of the mass and the elastic suspensions fixing said mass to the support is configured so as to exhibit at least two orthogonal natural modes of oscillation whose combination induces a right or left circular motion of a part at least of the suspended mass,
  the displacement motor(s) are configured so as to excite the two orthogonal modes of oscillation so as to alternately cause right and left circular motions of a part at least of the suspended mass, and
  the processing device measures the frequency and/or the phase of each right or left circular motion on the basis of the signals provided by the position sensors and extracts a measurement of rate of rotation from the difference of the measurements of frequencies and/or of phase between right circular motion and left circular motion.

Advantageously, the vibrating mass is a deformable mass constituting, with the elastic suspensions, a mechanical system exhibiting at least two natural modes whose combination induces a majority component of right or left circular displacement of the elements of the deformable mass.

Advantageously, the two orthogonal natural modes of oscillation have a slight frequency offset causing beating inducing a spontaneous alteration of a right rotation mode into a left rotation mode and vice versa, while passing through intermediate steps having linear motion.

Advantageously, the vibrating mass gyro comprises a servocontrol using the signals from the position sensors and from the processing device to control the displacement motor(s) in such a way as to keep the amplitudes of the right and left circular motions constant and equal.

Advantageously, the servocontrol delivers excitation pulses to the displacement motors during the intermediate steps having linear motion of the suspended mass or of a part of the latter, at the time that the suspended mass or a part of the latter passes through the midpoint of its linear trajectory.

Advantageously, the processing device comprises a circuit for detecting lead and lag quadratures between those components of the signals from the position sensors that relate to one of the natural modes of oscillation and those components of the signals from the position sensors that relate to the other orthogonal natural mode of oscillation.

Advantageously, the displacement motors and position sensors consist of one and the same device playing the two roles alternately.

Advantageously, the displacement motors individually influence one of the orthogonal natural modes of oscillation and not the other and are split into two groups of equal importance, the displacement motors of one group acting on one of the natural modes of oscillation and those of the other group acting on the other natural mode of oscillation.

Advantageously, the displacement motors and position sensors consist of one and the same device alternately playing the roles of displacement motor and of position sensor, are arranged so as to influence one of the orthogonal modes and not the other, and are split into two groups depending on whether they act on one or the other of the two orthogonal modes of oscillation.

Advantageously, the suspended mass is fixed to the support by a set of elastic suspensions allowing it to oscillate in a plane with natural modes of different frequencies along two orthogonal directions of the plane.

Advantageously, the suspended mass consists of two vibrating masses associated in such a way that their barycenter remains fixed.

Advantageously, the suspended mass consists of two vibrating masses with fixed barycenter that are obtained through associations of beams and of bending points.

Advantageously, the suspended mass is an annulus with two orthogonal natural bending modes oriented along axes 45° apart.

Advantageously, the suspended mass is a cylinder with two orthogonal natural bending modes oriented along axes 45° apart.

Advantageously, the suspended mass is a bowl whose edge presents two orthogonal natural bending modes oriented along axes 45° apart.

Advantageously, the displacement motors are piezoelectric devices.

Advantageously, the position sensors are piezoelectric devices.

Advantageously, the displacement motors are electrostatic devices.

Advantageously, the position sensors are electrostatic devices.

DESCRIPTION OF THE DRAWINGS

The present invention is illustrated by way of example, and not by limitation, in the figures of the accompanying drawings, wherein elements having the same reference numeral designations represent like elements throughout and wherein.

a FIG. 1 is a basic diagram of the vibrating mass gyros known in the prior art, a FIG. 2 shows the linear trajectories of the excitation and detection vibrations propelling, in the prior art, a gyro vibrating mass during a rotation rate measurement, a FIG. 3 shows a locus of the elliptical trajectories with variable eccentricity traversed by the vibrating mass of a gyro according to the invention during a rotation rate measurement.

DETAILED DESCRIPTION OF THE INVENTION

Figure 1:
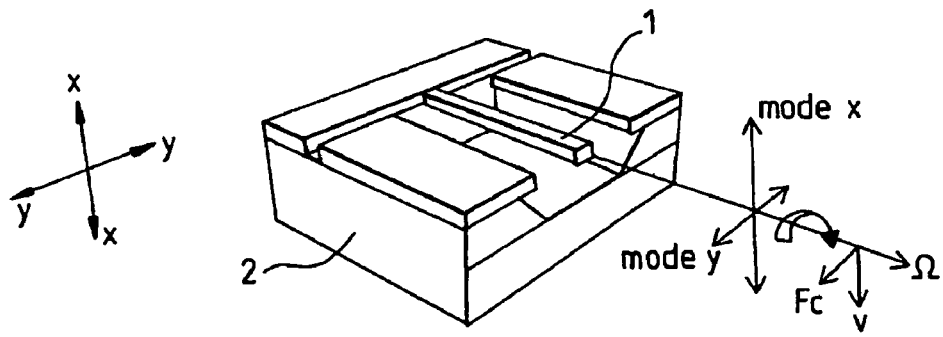
Figure 2:
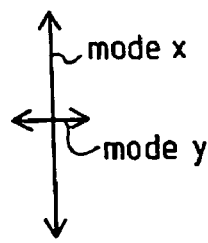

Most of the currently known vibrating mass gyros may be likened to that shown in FIG. 1 operating in the manner represented in FIG. 2.

A suspended mass represented in the form of a flexible bar 1 fixed by one end to a support 2 can oscillate according to two orthogonal modes of vibration with linear trajectories, one the x mode having a linear trajectory along an axis xx, the other the y mode having a linear trajectory along an axis yy orthogonal to the axis xx, these two modes not necessarily having identical frequencies.

The measurement technique used hitherto consists in making the suspended mass 1 vibrate according to one of the modes called the excitation mode, here the x mode, and in deducing the rate of rotation $\Omega$ of the casing of the gyro along the director axis of the xy plane, from the amplitude of the vibration of the mass in the y mode caused by the Coriolis force $F_c$, the y mode being called the detection mode. This measurement technique imposes limits on the stability of the devices that use it.

Let us consider the case of a micro-electro-mechanical device MEM, the excitation motion is made at a frequency of the order of 10 kHz with an amplitude x0 of 10 μm. The mass involved is of the order of 5.e-7 kg and the quality coefficient of the order of 50 000.

The excitation rate is then:

$v_x = 2\pi f x_0 = 0.628 m/s.$

The acceleration along x due to the excitation is:

$\gamma_x = (2\pi f)^2 x_0 = 4000 g.$

The Coriolis acceleration is:

$\gamma_c = 2\Omega v_x = 0.62 \mu g/°/h.$

If the Coriolis acceleration is detected through the y resonator with quality factor Qy, the motion is then:

$$y = \frac{Q\gamma_c}{(2\pi f)^2} = 7.7e - 11 \; m/°/h.$$

If the detection is made through a resonator with frequencies offset by 100 Hz, the motion becomes:

$$y = \frac{\gamma_c}{(2\pi f)^2 \frac{\Delta f}{f}} = 7.7e - 14 \; m/°/h.$$

These values are very small in relation to the deformations of the system on account of the vibrations, stresses and dilatations but are not out of range of the position sensors used in micro-electro-mechanical systems MEMs. Account must however be taken of the defects of alignment of the stiffness forces and the defects of the electronics controlling the excitation and processing the signals from the position sensors to estimate the amplitude of the vibration due to the Coriolis force.

On account of the imperfections of stiffness or of mass, the excitation motion is not perfectly aligned along the xx axis and possesses an undesirable component along the yy axis.

Depending on the source of the imperfection, this component is the source of nuisance forces along the yy axis in quadrature (case of a defect of stiffness or of mass) or in phase (case of a damping defect) with the Coriolis force.

A stiffness defect is manifested by the fact that the stiffness force induced by the excitation motion presents a misalignment $\alpha$ and possesses a component along the yy axis:

$F_y = \alpha F_x = \alpha k_x x$ ($k_x$ stiffness of the excitation mode, $x$ excitation motion)

A nuisance stiffness force ($\alpha k_x x$) along the yy axis therefore appears, in phase with the displacement along the xx axis, hence in phase quadrature with the Coriolis force. Such a defect of alignment is for example caused by flexural beams, the flanks of which would be inclined by $\alpha$ radians or, more generally, whose principal axes of inertia would be inclined by a radians. This nuisance force may be compared with the Coriolis force:

$$\frac{\alpha F_x}{m\gamma_c} = \frac{\alpha k_x x}{2m\omega x \Omega} = \frac{\alpha m \omega^2 x}{2m\omega x \Omega} = \alpha \frac{\omega}{2\Omega} \quad [1]$$

It is the source of a quadrature bias $K0_\perp$ which is none other than this nuisance force expressed as a unit of rotation rate:

$$K0_\perp = \alpha \frac{\omega}{2} \quad [2]$$

This misalignment bias $K0_\perp$ contributes to making the gyro drift. The question which then arises is the following: what is the maximum acceptable misalignment that guarantees repeatability of a few °/h. This bias $K0_\perp$ being in quadrature with the useful signal can be eliminated by demodulation but this presupposes that the demodulation is done without phase error. With a phase error of demodulation $\alpha_{dem}$, a part K0 of this bias is found on the output of the gyro:

$$K0 = \alpha_{dem} K0_\perp \qquad [3]$$

The repeatability of the output bias may then be written:

$$\Delta K0 = \Delta\alpha_{dem} \cdot K0_\perp = \Delta\alpha_{dem} \alpha \frac{\omega}{2} \qquad [4]$$

Thus, the bias repeatability $\Delta K0$ depends not only on the defect of alignment $\alpha$ of the stiffness force but also on the stability of the demodulation phase of the electronics $\Delta\alpha_{dem}$.

If one is aiming at a bias repeatability of 5°/h, the product $\Delta\alpha_{dem}.\alpha$ must therefore be:

$$\Delta\alpha_{dem} \cdot \alpha = 2\frac{\Delta K_0}{\omega} = 2\frac{5}{2*180*10000*3600} = 7.7e-10 \text{ rad}^2$$

If analog electronics are used, the phase accuracy $\Delta\alpha_{dem}$ probably cannot exceed 0.05°. To guarantee the repeatability of 5°/h, this requires that the defect of alignment $\alpha$ of the stiffness force be less than 0.9 μrad! This is equivalent to an offset of 0.5 angströms between the lower face and the upper face of the stiffness beams! (for a height of 60 μm), this being appreciably less than the size of a silicon crystal lattice cell (5.4 angströms).

It is readily appreciated that it is unrealistic to guarantee such a small defect of alignment even with painstaking balancing.

To improve the bias repeatability of a vibrating mass gyro, it is proposed that the suspended mass not be made to vibrate over a linear trajectory but that it be made to describe a circular trajectory in one direction and then in the other, with a rate equal to or very close to the natural pulsatance of the system and that the rate of rotation of the casing of the gyro along the director axis of the plane of the circular trajectory be deduced from the difference of the rates of traversal, in one direction and in the other of the circular trajectory.

The vibrating mass gyro always has a structure that can be reduced to the diagram of FIG. 1 but comprises displacement motors controlled in such a way as to propel the suspended mass or a part of the latter with a circular motion that reverses over time and a device for processing the signals from the vibrating mass displacement sensors deriving the rate of rotation of the carrier of the gyro, from the difference observed between measurements of frequency and/or of phase of the circular motion propelling the mass or a part of the latter when it describes its circular trajectory in one direction and in the other.

The mass is launched by means of the displacement motors over a circular trajectory with a rate of rotation $\omega_0$ equal or very close to the natural pulsatance of the system. For example if the resonators have a natural frequency of 10 000 Hz, the mass must be launched at a rate of 10 000 revolutions per second.

After launching the mass, if the excitation is cut, the latter will continue to traverse its circular trajectory freely with a rate of rotation $\omega_0$ equal to the resonant pulsatance of the system.

When the casing of the gyro is subjected to a rate of rotation $\Omega$ along the director axis of the plane of the circular trajectory of the suspended mass, the apparent rate of the circular motion of the mass of the gyro with respect to the casing becomes equal to $\omega_0 - \Omega$ since the rate of circular motion of the mass of the gyro remains constant with respect to an absolute reference frame.

Everything happens as if the mass were detached from the casing. An analogy may be made with the tuned gyro for which the spinning top appears to be free in space when it is driven at the tuning frequency (which is also a resonant frequency of sorts since it is obtained when the dynamic couples compensate for the stiffness couples).

Measurement of the rate of rotation of the mass of the gyro over its circular trajectory affords access to a gyrometric cue. Of course, on account of damping, the circular motion of the mass must be periodically relaunched. However, the damping is small enough for the perturbations in the motion to be negligible during the measurements.

In practice the system exhibits several types of imperfections:

the circular motion requires the suspended mass to have identical natural resonant frequencies in two orthogonal directions. But the latter can never be perfectly identical and always exhibit slight differences.

there are nuisance couplings of mass/stiffness and of damping between the excitations in the two orthogonal directions imparted by the displacement motors.

the oscillations caused in two orthogonal directions by the displacement motors are never strictly harmonic. Their frequencies therefore depend on their amplitudes.

the frequency of the circular motion depends on its amplitude.

Figure 3:
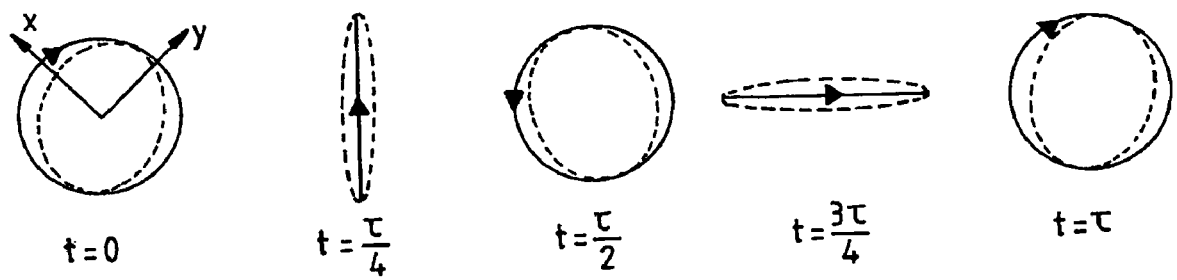

The beating due to the offset existing between the resonant frequencies in the two orthogonal directions of the plane of the trajectory of the suspended mass has the effect of making the suspended mass describe Lissajous figures, its trajectory taking an elliptic overall shape whose eccentricity alters periodically from +1, where it has a circular shape, to −1 where it regains a circular shape, passing through 0 where it is flattened into a linear shape. Specifically, let us assume that the resonant frequencies are offset by $\Delta f_0$ and that the casing of the gyro is immobile ($\Omega$=0). The shape of the trajectory of the suspended mass will periodically modify itself with a periodicity equal to:

$$\tau = \frac{1}{\Delta f_0}$$

the trajectory of the suspended mass passing successively through the four typical shapes represented in FIG. 3:

a circular shape described in the forward direction at the rate of rotation $\omega_0$ ($\omega_0$ being equal to the average of the natural pulsatances of each resonator), a forward linear shape of vibration frequency $\omega_0$, a circular shape described in the reverse direction but with the same rate of rotation $\omega_0$, and a reverse linear shape of vibration frequency $\omega_0$.

These four shapes of trajectory appear successively at:

$$t = 0, \frac{\tau}{4}, \frac{\tau}{2}, \frac{3\tau}{4}.$$

Switches from one to the other are made through progressive alterations of the eccentricity, a trajectory of circular shape progressively taking a linear shape and then a circular shape again as occurs in the Lissajous figures.

When the casing of the gyro is subjected to a rotational motion of rate $\Omega$ along the director axis of the circular trajectory of the suspended mass, the apparent rate of rotation of the suspended mass over the trajectories of circular shape will be $\omega_0-\Omega$ for a traversal in the forward direction and $-\omega_0-\Omega$ for a traversal in the reverse direction while the pulsatance of traversals of the trajectories of linear form will be $\omega_0$. The gyrometric cue which is the measurement of the rate of rotation $\Omega$ appears in the algebraic sum of the apparent rates of rotation of the suspended mass when it traverses a trajectory of circular shape in the forward direction $\omega_{ad}$ and in the reverse direction $\omega ai_0$:

$$-2\Omega=\omega_{ad}+\omega_{ai}=\omega_0-\Omega-\omega_0-\Omega.$$

The combination of the apparent rates of rotation of the suspended mass when it traverses the same trajectory of circular shape in the forward direction and in the reverse direction makes it possible to eliminate from the measurement of the gyrometric cue, the perturbing effects of the nuisance couplings, including those due to the misalignments in the rate of rotation $\omega_0$.

Figure 4:
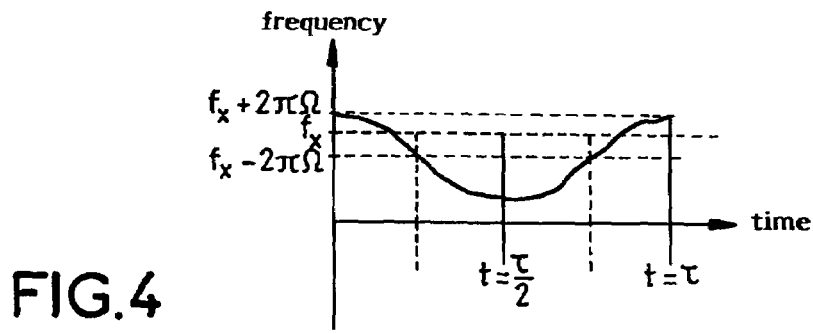
FIGS. 4 and 5 are charts illustrating the effects of a rotational motion on the apparent vibration frequencies along two orthogonal axes of the vibrating mass of a gyro in accordance with the invention, a FIG. 6 is a basic diagram of a vibrating mass gyro according to the invention, a FIG. 7 is a chart of curves explaining the operation of a gyro according to the invention.
Figure 5:
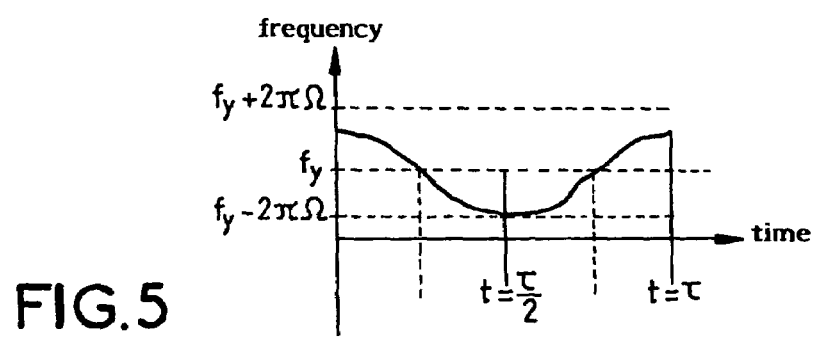

When the frequency of the component of the motion along xx (or along yy) is measured for example, one observes a modulation of the frequency around the natural resonant frequency of the suspended mass along xx (or along yy) as illustrated in FIGS. 4 and 5.

The "natural" reversal of the direction of rotation of the suspended mass of the gyro stemming from a difference between the natural resonant frequencies of the suspended mass along two orthogonal directions xx, yy of the plane of its trajectory is exploited in order to simplify the gyrometric measurement. Instead of searching for the natural resonant frequencies that are rigorously equal in two orthogonal directions, an offset is deliberately introduced between them.

We choose for example a frequency mismatch of 100 Hz for a mean frequency of 10 000 Hz. If the motion of the suspended mass along the xx axis is observed over a duration of 10 ms, one will see 100 alternations with an instantaneous frequency varying sinusoidally between $f_x+2\pi\Omega$ and $f_x-2\pi\Omega$.

Since the frequency variations to be measured are small, a rate of rotation of 100°/h causing a variation in the frequency of 0.003 Hz corresponding to 0.3 ppm of the central frequency, it is preferable for the frequency to be measured in each direction by one and the same electronic system and according to the same procedure, for example, through a measurement of the time separating two passes, in one and the same direction, of the vibrating mass through the zero position along the xx' axis, the zero position being the middle position along the xx axis.

An electronic measurement system usable for the measurements of the apparent frequencies of traversal of a circular trajectory, in both directions, by the suspended mass which is of simple embodiment may be constructed on the basis of an analog/digital converter sampling in digital on 12 bits, at a sampling speed of a few tens of kilohertz, the signal from an electrostatic position sensor and from a frequency detection circuit operating, for example, by Fourier analysis.

By observing over windows of 20 ms (200 cycles) centered on the instants at which the suspended mass is propelled by a right or left circular rotational motion, it is possible to obtain an accuracy of the order of 100 microhertz (digitization jitter: 100 µRd averaged over 100 samples for a period of 1000 radians). The error in heading is then of the order of 10 µRd at each measurement and grows in line with the root at the time: i.e. 140 µRd in 1 s, 1 µRd in 1 minute, 0.5 degrees in one hour. To fully utilize the performance of a position sensor commonly used in micro-electro-mechanical systems MEMs, it would be necessary to employ a 16-bit analog/digital converter. One could then reasonably expect 10 times lower an error. This shows the point at which the absence of bias outweighs the measurement accuracy.

The accuracy of the gyrometric cue derived from the measurements relies on the symmetry of the counterrotating circular motions of the suspended mass of the gyro. It depends on the amplitudes of the circular motions and on their relative mismatch as well as on the linearity of the restoring forces of the elastic suspensions of the mass. By distributing the elastic energy over the moving mass, the deformation can be limited to a few $10^{-3}$; the nonlinearity is only a fraction of the deformation on account of the compensation between compressed part and stretched part.

The energy necessary to sustain the motion of the suspended mass is of the order of a thousandth of the energy of the oscillator. In order to decrease the dissymmetry, this energy is preferentially injected into the suspended mass when it describes the linear trajectories providing the transitions between the circular trajectories in a Lissajous figure by applying impulse forces to it in the direction of its displacement, preferably at its zero crossing, that is to say when it crosses through the midpoints of the linear trajectories. The impulse forces delivered in the xx direction will be so by the same displacement motor for each of the linear phases; the same holds in the yy direction.

Figure 6:
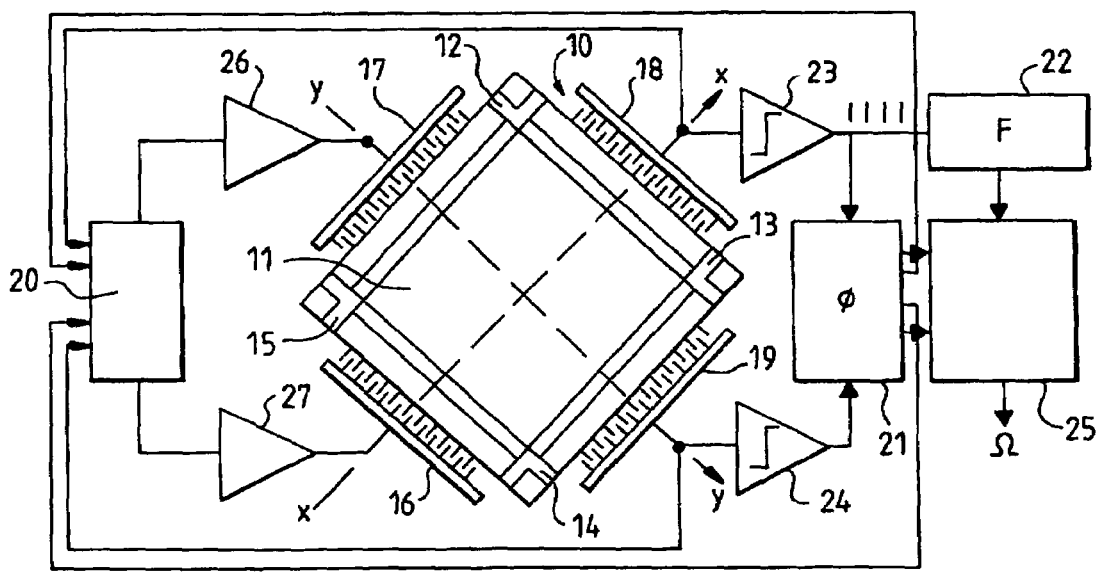

FIG. 6 diagrammatically illustrates an exemplary embodiment of a vibrating mass gyro operating in the manner just described. Depicted therein is a micro-electro-mechanical member MEM 10 composed of a suspended mass 11, of square shape, fixed by flexible blades 12 to 15 to a support that is not visible since it is placed underneath, of displacement motors 16, 17, of electrostatic type, placed on the support, along two adjacent sides of the mass 11 so as to be able to drive it along two orthogonal coplanar directions xx and yy and of position sensors 18, 19, of electrostatic type, placed on the support along the other two adjacent sides of the mass 11 so as to measure the displacements of the latter in the two directions xx and yy.

The mass 11 and the flexible blades 12 to 15 of the suspensions are configured in such a way as to conform to symmetries with respect to two coplanar axes xx and yy. The stiffnesses of the flexible blades are adjusted, for example by erosion of material by means of a laser, in such a way that the suspended mass is given natural resonant modes in the two orthogonal directions xx and yy having a frequency mismatch of the order of 100 hertz.

The displacement motors 16, 17 make it possible to set the mass 11 into motion in the plane of the figure so as to produce a gyro responsive to the rotations of its casing along the director axis of the plane of the figure. One, the displacement motor 16, excites a mode of vibration of the system consisting of the mass 11 and of its flexible blade suspensions 12 to 15, which mode is oriented along the xx axis of the plane of the figure while the other, the displacement motor 17, excites another mode of vibration of the system consisting of the mass 11 and of its flexible blade suspensions 12 to 15, which mode is orthogonal to the first and oriented along the yy axis of the plane of the figure.

The position sensors 18, 19 supply signals, used by a pulse generator 20, that measure the displacements of the suspended mass in the xx and yy directions, to a phase-shift measuring circuit 21 and a frequency meter circuit 22.

The phase-shift measurement circuit 21 detects the instants at which the oscillations of the suspended mass 11 along the xx and yy directions are in phase, in phase opposition, in lead quadrature and in lag quadrature. To do this, it utilizes the zero crossings of the signals supplied by the displacement sensors 18, 19 which are revealed by peak-limiting amplifiers 23, 24.

The frequency meter 22 measures the frequency of the oscillations of the suspended mass along the xx direction on the basis of the zero crossings of the signal from the position sensor 18 revealed by the peak-limiting amplifier 23 and supplies this frequency measurement to a circuit 25 for extracting the gyrometric cue Ω.

The circuit 25 for extracting the gyrometric cue Ω uses the information delivered by the frequency meter 22 and by the phase-shift measurement circuit 21. More precisely, it takes into account the frequency measurements delivered by the frequency meter 22 when the phase-shift measurement circuit 21 signals to it that the oscillations of the suspended mass 11 are close to a front or rear quadrature characteristic of a circular motion. It averages the frequency measurements received over a few tens of revolutions and then subtracts the averages obtained for a front quadrature and a rear quadrature and interprets the result of the subtraction as a measurement of twice the rate of rotation of the casing of the rig along the director axis of the plane containing the two coplanar axes xx and yy.

The pulse generator 20 delivers excitation pulses to the displacement motors 16, 17 by way of two pulse amplifiers 26, 27. It adjusts the amplitudes and/or the frequency of these pulses and the directions that the speed of the suspended mass must have when these pulses are applied to the displacement motors 16, 17 in such a way as to sustain oscillatory motions of the suspended mass along the orthogonal axes xx and yy with constant and identical mean amplitudes. To do this, it comprises a servocontrol extracting from the signals from the position sensors 18, 19 the mean amplitudes of the oscillatory motions of the suspended mass 11 along the orthogonal axes xx and yy, so as to compare them with a preset and use the discrepancies detected to determine the amplitudes and/or the frequencies of the pulses to be emitted as well as the directions that the speed of the suspended mass must have when they are applied to the displacement motors 16, 17. Once it has determined the amplitudes and/or the frequencies of the pulses to be emitted and the directions that the speed of the suspended mass must have when they are applied, the servocontrol of the pulse generator 20 uses the information from the phase-shift measurement circuit 23 to identify the instantaneous orientation of the speed of displacement of the suspended mass and emit at the appropriate times the excitation pulses destined for the displacement motors 16, 17.

Figure 7:
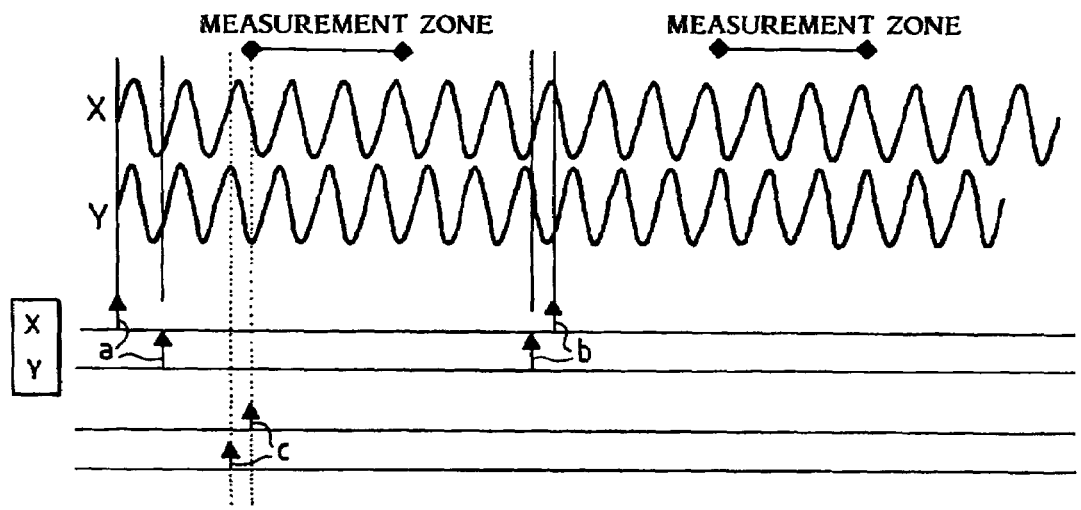

The charts of FIG. 7 illustrate possible modes of sustaining of the motion of the suspended mass 11 during the phases where the suspended mass oscillates along linear trajectories.

If no account is taken of the imperfections of the mechanical system consisting of the suspended mass and of the contribution of the external rotations, the simple sustaining of the motion during the phases of oscillation with linear trajectory which are oriented at 45° and 225° to the axis xx as shown in FIG. 3 can be effected by supplying the displacement motors 16, 17 with pairs of pulses of like amplitude separated by an even number of half-cycles during in-phase passes (pulse pair a) and by an odd number of half-cycles during phase opposition passes (pulse pair b) of the oscillations of the suspended mass 11 along the orthogonal directions xx and yy. The pulses of these pairs are applied with a sign suitable for accelerating the suspended mass and having a constructive effect since the sustaining of the motion is aimed at counteracting friction. Each pulse is applied to a displacement motor 16, 17, preferably, at those times when the suspended mass passes through the middle of its linear trajectory.

In order to minimize the influence of the electronics on the defects of pairing of the electronic pulses and of the transducers used in the motors and the sensors, it is advantageous to use the same circuit to sustain the motion of the suspended mass during a 45° linear trajectory phase or a 225° linear trajectory phase.

To correct the angular drifting of the phases of linear motion of the suspended mass that are due to the imperfections of the mechanical system consisting of the suspended mass and to the contribution of the external rotations, the pulse generator 20 also produces pairs of pulses (c FIG. 7) of variable amplitudes at instants at which the speed of the suspended mass is aligned with the xx axis in respect of the displacement motor 16 and with the yy axis in respect of the displacement motor 17.

The diagram just described in relation to FIG. 6 can accommodate numerous variants.

The displacement motors and the position sensors which are often built identically in micro-electro-mechanical technology MEM can consist of devices alternately playing a motor role and a sensor role. Likewise, motors and sensors may be more numerous. In this case, they are preferentially distributed into two groups each specialized in the excitation and the detection of one of the orthogonal natural modes of vibration of the suspended mass. The motors and sensors may likewise not be of piezoelectric type.

The suspended mass exhibits a symmetry with respect to the two axes xx and yy but is not necessarily square. Various polygonal and other shapes are suitable. It may even consist of two vibrating masses associated in such a way that their barycenter remains fixed, and obtained, for example, by associations of beams and of bending points.

A preferential shape for the suspended mass is that of an annulus, cylinder or bowl, since it corresponds to a fully balanced and isolated system.

Love (theory of elasticity 1927) and Timoshenko (vibration problems in engineering 1937) have analyzed the modes of vibrations of an annulus and have shown the existence of two types of fundamental modes, a first type of the form:

$$R = a\,\cos(2\omega t) + b\,\sin(2\omega t)$$

and a second type of the form:

$$T = 0.5b\,\cos(2\omega t) - 0.5a\,\sin(2\omega t)$$

where R and T are the radial displacements, a and b are the sinusoidally time-dependent amplitudes.

It is difficult to physically picture the behavior of an annular mobile mass excited according to these two fundamental modes of vibration but, in reality, operation is obtained which is entirely analogous to that of the suspended mass propelled with two vibratory motions having orthogonal linear trajectories. The two vibration axes a and b are no longer perpendicular but 45° apart. These vibrations are orthogonal oscillations in the mathematical sense of the term since they can be excited independently. For equal oscillations in quadrature:

$$a = \cos(\omega t)$$

$$b = \sin(\omega t)$$

the motion of each element of the annulus is of the type $R = \cos(\omega t - 2\Theta)$ $T = 0.5a \sin(\omega t - 2\Theta)$.

The gyrometric cue is afforded a shape factor of the order of 0.7 on account of the elliptic motions of each element of the annulus. The right and 45° excitation and detection means may, for example, be of electrostatic type. In order to give rise to Lissajous figures, the right and 45° modes must resonate at slightly different frequencies. This is obtained by introducing a small defect of rigidity or of mass along the right or 45 directions.

Figure 8:
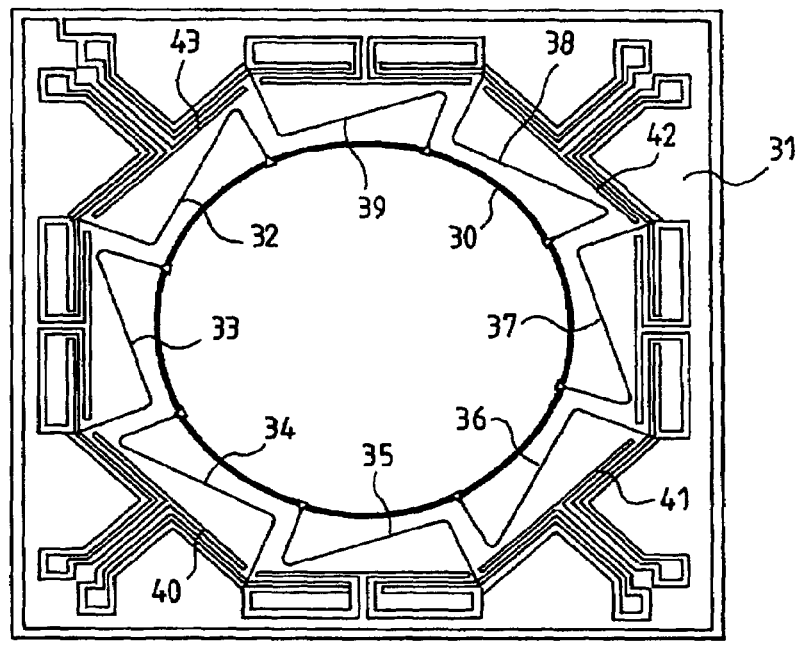
FIGS. 8 and 9 show examples of vibrating mass mechanical systems usable in a gyro according to the invention.

FIG. 8 gives an exemplary embodiment in micro-electromechanical technology MEM of a gyro with an annular vibrating mass 30 fixed to a support 31 by its outer periphery by means of eight deformable elastic arms 32 to 39, some of which 32, 34, 36, 38 form part of motors 40, 43 or of position sensors 41, 42 of electrostatic type. A dissymmetry is introduced on two opposite arms in such a way as to obtain slightly different resonant frequencies for the two fundamental modes of vibration of the annulus so as to obtain beating that produces a phase mismatch traveling between the two fundamental modes of vibration and giving rise to a Lissajous figure.

Figure 9:
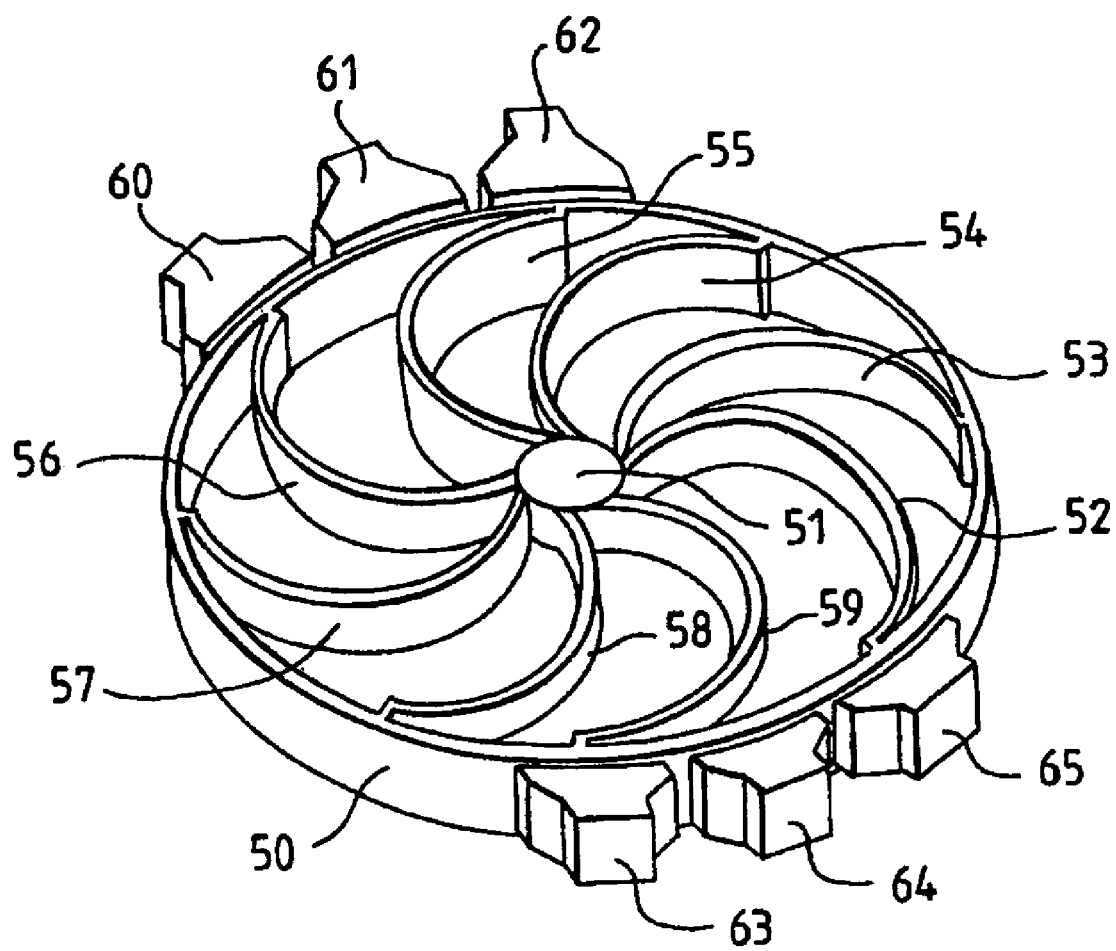

FIG. 9 gives another exemplary embodiment of an annular vibrating mass gyro in which the annular vibrating mass 50 is fixed to a hub 51 fastened to a support by means of eight deformable elastic arms 52 to 59 attaching the hub 51 to its inner periphery. Electrodes 60 to 65 disposed on the support at the outer periphery of the annulus make it possible to sustain the two fundamental modes of vibration of the annulus, to control them and to detect their instantaneous phase shift. As in the previous example, a dissymmetry is introduced between opposite arms in such a way as to obtain slightly different resonant frequencies between the two fundamental modes of vibration whose beatings produce a Lissajous figure.

The two gyro embodiments with annular suspended mass are merely some among other examples. All the shapes of suspended mass such as the bowl or cylinder shapes used according to the former method consisting in exciting a first fundamental mode of vibration and in searching for the effect of the Coriolis force on a second fundamental mode of vibration orthogonal to the first are usable with the novel method advocated based on a measurement of the apparent periodicity of the motion of the suspended mass when it is the cause of two orthogonal modes of vibration of like amplitude in lead and lag phase quadrature.

The invention claimed is:

1. A vibrating mass gyro comprising:
   a support,
   a mass,
   elastic suspensions fixing the mass to the support,
   one or more displacement motors sustaining a vibratory motion of the suspended mass,
   position sensors of the moving elements of the suspended mass, and
   a processing device extracting a measurement of circular oscillation rate from the signals delivered by the position sensors, wherein:
   the mechanical system consisting of the mass and the elastic suspensions fixing said mass to the support is configured to exhibit at least two orthogonal natural modes of oscillation whose combination induces a right or left circular motion of at least a part of the suspended mass,
   the displacement motor(s) are configured to excite the two orthogonal modes of oscillation so as to alternately cause right and left circular motions of at least a part of the suspended mass, and
   the processing device measures the frequency and/or the phase of each right or left circular motion on the basis of the signals provided by the position sensors and extracts a measurement of rate of rotation from the difference of the measurements of frequencies and/or of phase between right circular motion and left circular motion.

2. The gyro as claimed in claim 1, wherein the vibrating mass is a deformable mass and wherein the mechanical system consisting of the deformable vibrating mass and of the elastic suspensions exhibits at least two natural modes whose combination induces a majority component of right or left circular displacement of the elements of the deformable mass.

3. The gyros as claimed in claim 1, wherein the two orthogonal natural modes of oscillation have a slight frequency offset causing, by beating, a spontaneous alteration of a right circular motion of the suspended mass or of a part of the latter, into a left circular motion and vice versa.

4. The gyro as claimed in claim 1, which comprises a servocontrol using the signals from the position sensors and from the processing device to control the displacement motor(s) to keep the amplitudes of the right and left circular motions constant and equal.

5. The gyro as claimed in claim 1, wherein the two orthogonal natural modes of oscillation have a slight frequency offset causing, by beating, a periodic transformation of a right circular motion of the suspended mass or of a part of the latter, into a left circular motion and vice versa, while passing through intermediate steps having linear motion.

6. The gyro as claimed in claim 5, which comprises a servocontrol using the signals from the position sensors and from the processing device to control the displacement motors to keep the amplitudes of the right and left circular motions constant and equal.

7. The gyro as claimed in claim 6, wherein the servocontrol delivers excitation pulses to the displacement motors during the intermediate steps having linear motion of the suspended mass or of a part of the latter.

8. The gyro as claimed in claim 6, wherein the servocontrol delivers excitation pulses to the displacement motors during the intermediate steps having linear motion of the suspended mass or of a part of the latter, at the time that the suspended mass or a part of the latter passes through the midpoint of the linear trajectory.

9. The gyro as claimed in claim 1, wherein the processing device measures the frequency and/or the phase of each right or left circular motion on the basis of the signals provided by position sensors responsive to one of the orthogonal natural modes of oscillation of the suspended mass or of a part of the latter.

10. The gyro as claimed in claim 1, wherein the processing device comprises a circuit for detecting lead and lag quadratures between those components of the signals from the position sensors that relate to one of the natural modes of oscillation and those components of the signals from the position sensors that relate to the other orthogonal natural mode of oscillation.

11. The gyro as claimed in claim 1, wherein the displacement motors and position sensors consist of one device playing the two roles alternately.

12. The gyro as claimed in claim 1, wherein the displacement motors individually influence one of the orthogonal natural modes of oscillation and not the other and are split into two groups of equal importance, the displacement motors of one group acting on one of the natural modes of oscillation and those of the other group acting on the other natural mode of oscillation.

13. The gyro as claimed in claim 1, wherein the displacement motors and position sensors consist of one device alternately playing the roles of motor and of position sensor, and are arranged to influence one of the orthogonal modes and not the other, and are split into two groups depending on whether they act on one or the other of the two orthogonal modes of oscillation.

14. The gyro as claimed in claim 1, wherein the suspended mass is fixed to the support by a set of elastic suspensions allowing the mass to oscillate in a plane with natural modes of different frequencies along two orthogonal directions.

15. The gyro as claimed in claim 1, wherein the suspended mass consists of two vibrating masses associated such that the barycenter remains fixed.

16. The gyro as claimed in claim 1, wherein the suspended mass consists of two vibrating masses with fixed barycenter obtained through associations of beams and of bending points.

17. The gyro as claimed in claim 1, wherein the suspended mass is an annulus with two orthogonal natural bending modes oriented along axes 45° apart.

18. The gyro as claimed in claim 1, wherein the suspended mass is a cylinder with two orthogonal natural bending modes oriented along axes 45° apart.

19. The gyro as claimed in claim 1, wherein the suspended mass is a bowl whose edge presents with two orthogonal natural bending modes oriented along axes 45° apart.

20. The gyro as claimed in claim 1, wherein the displacement motors are piezoelectric devices.

21. The gyro as claimed in claim 1, wherein the position sensors are piezoelectric devices.

22. The gyro as claimed in claim 1, wherein the displacement motors are electrostatic devices.

23. The gyro as claimed in claim 1, wherein the position sensors are electrostatic devices.

* * * * *